United States Patent Office 3,134,802
Patented May 26, 1964

3,134,802
2-BENZYL-4-CHLOROPHENYL HYDROCARBYL CARBONATES
Van R. Gaertner and Robert M. Schisla, Dayton, Ohio, assignors to Monsanto Company, a corporation of Delaware
No Drawing. Filed July 29, 1959, Ser. No. 830,181
14 Claims. (Cl. 260—463)

This invention relates to new organic compounds, useful as biological toxicants, and to methods for their preparation and use.

The new compounds may be described as organic carbonates containing aromatic and acyclic substituents. For reasons of convenience, the new compounds herein are more fully described by the following general formula:

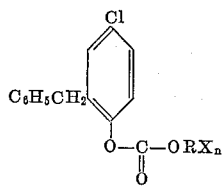

where R is a hydrocarbon radical of from one to eight carbon atoms, X is a radical from the group consisting of hydrogen and halogen, and $n$ is an integer of from one to five. Preferably the hydrocarbon radical will be a saturated hydrocarbon radical or a double bond-unsaturated hydrocarbon radical.

The following specific compounds are illustrative of the new compounds of this invention which are embraced by the above-described general formula:

2-benzyl-4-chlorophenyl methyl carbonate
2-benzyl-4-chlorophenyl ethyl carbonate
2-benzyl-4-chlorophenyl 2-chloroethyl carbonate
2-benzyl-4-chlorophenyl 2-bromoethyl carbonate
2-benzyl-4-chlorophenyl n-propyl carbonate
2-benzyl-4-chlorophenyl 3-chloropropyl carbonate
2-benzyl-4-chlorophenyl 2,3-dichloropropyl carbonate
2-benzyl-4-chlorophenyl 2,3-dibromopropyl carbonate
2-benzyl-4-chlorophenyl 3-iodopropyl carbonate
2-benzyl-4-chlorophenyl isopropyl carbonate
2-benzyl-4-chlorophenyl allyl carbonate
2-benzyl-4-chlorophenyl 3-chloroallyl carbonate
2-benzyl-4-chlorophenyl n-butyl carbonate
2-benzyl-4-chlorophenyl 4-chlorobutyl carbonate
2-benzyl-4-chlorophenyl 4-bromobutyl carbonate
2-benzyl-4-chlorophenyl-2-butenyl carbonate
2-benzyl-4-chlorophenyl 4-chloro-2-butenyl carbonate
2-benzyl-4-chlorophenyl n-pentyl carbonate
2-benzyl-4-chlorophenyl n-hexyl carbonate
2-benzyl-4-chlorophenyl 5,6-dichlorohexyl carbonate
2-benzyl-4-chlorophenyl 6-bromohexyl carbonate
2-benzyl-4-chlorophenyl 5-hexenyl carbonate
2-benzyl-4-chlorophenyl 2-ethylhexyl carbonate
2-benzyl-4-chlorophenyl octyl carbonate
2-benzyl-4-chlorophenyl cyclohexyl carbonate
2-benzyl-4-chlorophenyl cyclohexylmethyl carbonate
2-benzyl-4-chlorophenyl cyclohexylethyl carbonate
2-benzyl-4-chlorophenyl 4-ethylcyclohexyl carbonate
2-benzyl-4-chlorophenyl 4-chlorocyclohexyl carbonate
2-benzyl-4-chlorophenyl 4-bromocyclohexyl carbonate
2-benzyl-4-chlorophenyl 2,4-dichlorocyclohexyl carbonate
2-benzyl-4-chlorophenyl 2,4,6-tribromocyclohexyl carbonate
2-benzyl-4-chlorophenyl 2,3,4,5,6 - pentachlorocyclohexyl carbonate
2-benzyl-4-chlorophenyl 2-cyclohexenyl carbonate
2-benzyl-4-chlorophenyl 3,5-cyclohexadienyl carbonate
2-benzyl-4-chlorophenyl cyclopentyl carbonate
2-benzyl-4-chlorophenyl 4-chlorophenyl carbonate
2-benzyl-4-chlorophenyl pentachlorophenyl carbonate
2-benzyl-4-chlorophenyl 4-bromophenyl carbonate
2-benzyl-4-chlorophenyl phenyl carbonate
2-benzyl-4-chlorophenyl 4-iodophenyl carbonate
2-benzyl-4-chlorophenyl 4-methylphenyl carbonate
2-benzyl-4-chlorophenyl 4-ethylphenyl carbonate
2-benzyl-4-chlorophenyl 4-chloroethylphenyl carbonate
2-benzyl-4-chlorophenyl benzyl carbonate
2-benzyl-4-chlorophenyl 2,3,4,5,6-pentachlorobenzyl carbonate
2-benzyl-4-chlorophenyl 4-bromobenzyl carbonate
2-benzyl-4-chlorophenyl 4-iodobenzyl carbonate
2-benzyl-4-chlorophenyl phenylethyl carbonate
2-benzyl-4-chlorophenyl 4-chlorophenylethyl carbonate
2-benzyl-4-chlorophenyl 3,5-dichlorophenylethyl carbonate Those skilled in the art will perceive the remaining compounds which are not named herein, and which fall within the general formula above set out, from the examples set forth above. Thus, while not specifically named, the invention extends to such remaining compounds.

The above-described compounds may be prepared by either of two methods as follows: (1) the reaction of 2-benzyl-4-chlorophenol with alcohol-derived chloroformates corresponding to the "R" portion of the foregoing general formula for the compounds as indicated in the exemplary equation,

I

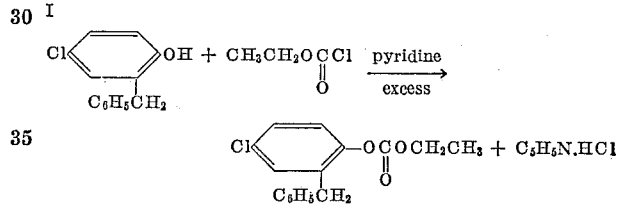

(2) the reaction of 2-benzyl-4-chlorophenyl chloroformate with alcohols corresponding to the "R" portions of the foregoing general formula for the compounds as indicated in the exemplary equation,

II

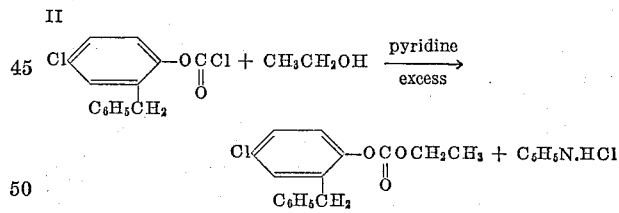

In the examples herein provided, the reaction of Equation I is employed.

The reactions leading to the various compounds which may be obtained are carried out in an appropriate basic solvent, pyridine being suitable except when benzyl chloroformate is being employed, in which cases it is desirable to employ solvents such as benzene or toluene, and in instances an appropriate scavenger for HCl, for example $Na_2CO_3$. As will be understood, where pyridine is employed in forming, for example, a chlorohydrocarbon derivative, reaction between the product and pyridine may occur, resulting in quaternary ammonium salt formation, which is undesirable. In the case of aryl chloroformates, in instances they are found to be decomposed to some extent by pyridine. Inasmuch as the reactions are exothermic, and since chloroformates are readily decomposed by heat, it is desirable to employ a substantial excess of solvent; moreover, for the same reason, it is desirable to ice the reaction vessel and to stir the contents. In practice, 2-benzyl-4-chlorophenol is dissolved in the solvent, e.g., pyridine, and the solution is charged to the reaction vessel. Thereafter, the chloroformate is slowly added with stirring. The iced mixture is allowed to stand several hours, suitably, overnight or about eighteen hours, with stirring, after which the pyridine is removed using a water aspirator with mild heating. The residue is then hydrolyzed with 3 N NaOH and extracted several times with ether, discarding the aqueous layer. The ether layer is then stripped of excess ether and the residual material is distilled under vacuum. The thus isolated material is found to be the desired carbonate. In order to make up for loss of the chloroformate due to possible decomposition, and to assure reaction of as much of the phenol as possible, it is preferable to employ a substantial molar excess of the chloroformate, for example, a fifty percent or more excess; however, this is not necessary to obtaining a significant yield of the desired compound. In order to illustrate more fully the results that are obtained while employing the foregoing described procedure, examples are provided hereinafter.

*Example I*

A solution composed of 600 ml. of pyridine and 43.6 g. (0.2 mole) of 2-benzyl-4-chlorophenol is charged to a four-necked flask which is fitted with a stirrer, reflux condenser and thermometer, and mounted in an ice bath. Methyl chloroformate in the amount of 38.0 g. (0.4 mole) is then slowly added to the solution and the reaction mixture thus formed is allowed to stand about 18 hours while stirring. The solvent, pyridine, is then removed using a water aspirator and mild heating, i.e., about 35°–40° C. The residue is then hydrolyzed with 3 N NaOH and extracted several times with ether, discarding the aqueous layer. The ether layer is then stripped of excess ether and the residual material is distilled under vacuum. The crude product is a viscous yellow liquid, the yield being 46.3 g. (84%), boiling at 166°–168° C. (2.2 mm.). The crude product is then redistilled under vacuum and the cut boiling at 167° C. (2.2 mm.) is found upon analysis to be the desired 2-benzyl-4-chlorophenyl methyl carbonate.

*Example II*

A solution composed of 600 ml. of pyridine and 43.6 g. (0.2 mole) of 2-benzyl-4-chlorophenol is charged to a four-necked flask which is fitted with a stirrer, reflux condenser and thermometer, and mounted in an ice bath. Ethyl chloroformate in the amount of 43.3 g. (0.4 mole) is then slowly added to the solution and the reaction mixture thus formed is allowed to stand about 18 hours while stirring. The solvent, pyridine, is then removed using a water aspirator and mild heating, i.e., about 35°–40° C. The residue is then hydrolyzed with 3 N NaOH and extracted several times with ether, discarding the aqueous layer. The ether layer is then stripped of excess ether and the residual material is distilled under vacuum. The crude product is a viscous yellow liquid, the yield being 56.0 g. (96.5%), boiling at 173°–175° C. (1.4 mm.). The crude product is then redistilled under vacuum and the cut boiling at 160°–162° C. (1.0 mm.) is found upon analysis to be the desired 2-benzyl-4-chlorophenyl ether carbonate ($C_{16}H_{15}ClO_3$). Calculated: %C, 66.09; %H, 5.20; %Cl, 12.19. Found: %C, 65.62, 66.05; %H, 5.34, 5.37; %Cl, 12.26, 12.29.

*Example III*

A solution composed of 600 ml. of pyridine and 43.6 g. (0.2 mole) of 2-benzyl-4-chlorophenol is charged to a four-necked flask which is fitted with a stirrer, reflux condenser and thermometer, and mounted in an ice bath. n-Propyl chloroformate in the amount of 48.8 g. (0.4 mole) is then slowly added to the solution and the reaction mixture thus formed is allowed to stand about 18 hours while stirring. The solvent, pyridine, is then removed using a water aspirator and mild heating, i.e., about 350°–40° C. The residue is then hydrolyzed with 3 N NaOH and extracted several times with ether, discarding the aqueous layer. The ether layer is then stripped of excess ether and the residual material is distilled under vacuum. The crude product is a viscous yellow liquid, the yield being 55.8 g. (92.0%) boiling at 165°–167° C. (1.2 mm.). The crude product is then redistilled under vacuum and the cut boiling at 167° C. (1.2 mm.) is found upon analysis to be the desired 2-benzyl-4-chlorophenyl n-propyl carbonate ($C_{17}H_{17}ClO_3$). Calculated: %C, 66.99; %H, 5.62; %Cl, 11.63. Found: %C, 66.94, 66.85; %H, 5.64, 5.55; %Cl, 11.60, 11.43.

*Example IV*

A solution composed of 600 ml. of pyridine and 43.6 g. (0.2 mole) of 2-benzyl-4-chlorophenol is charged to a four-necked flask which is fitted with a stirrer, reflux condenser and thermometer, and mounted in an ice bath. n-Butyl chloroformate in the amount of 54.4 g. (0.4 mole) is then slowly added to the solution and the reaction mixture thus formed is allowed to stand about 18 hours while stirring. The solvent, pyridine, is then removed using a water aspirator and mild heating, i.e., about 35°–40° C. The residue is then hydrolyzed with 3 N NaOH and extracted several times with ether, discarding the aqueous layer. The ether layer is then stripped of excess ether and the residual material is distilled under vacuum. The crude product is a viscous yellow liquid, the yield being 58.5 g. (92.0%), boiling at 175°–176° C. (1.2 mm.). The crude product is then redistilled under vacuum and the cut boiling at 181°–184° C. (2.0 mm.) is found upon analysis to be the desired 2-benzyl-4-chlorophenyl n-butyl carbonate ($C_{18}H_{19}ClO_3$). Calculated: %C, 67.81; %H, 6.00; %Cl, 11.12. Found: %C, 67.98, 67.81; %H, 6.17, 6.47; %Cl, 11.16, 10.85.

*Example V*

A solution composed of 600 ml. of pyridine and 43.6 g. (0.2 mole) of 2-benzyl-4-chlorophenol is charged to a four-necked flask which is fitted with a stirrer, reflux condenser and thermometer, and mounted in an ice bath. Isobutyl chloroformate in the amount of 54.4 g. (0.4 mole) is then slowly added to the solution and the reaction mixture thus formed is allowed to stand about 18 hours while stirring. The solvent, pyridine, is then removed using a water aspirator and mild heating, i.e., about 35°–40° C. The residue is then hydrolyzed with 3 N NaOH and extracted several times with ether, discarding the aqueous layer. The ether layer is then stripped of excess ether and the residual material is distilled under vacuum. The crude product is a viscous yellow liquid, the yield being 59.1 g. (92.5%), boiling at 172°–174° C. (1.3 mm.). The crude product is then redistilled under vacuum and the cut boiling at 173° C. (1.3 mm.) is found upon analysis to be the desired 2-benzyl-4-chlorophenyl isobutyl carbonate

($C_{18}H_{19}ClO_3$)

Calculated: %C, 67.81; %H, 6.00; %Cl, 11.12. Found: %C, 67.56, 67.78; %H, 5.92, 6.00; %Cl, 11.26, 11.22.

*Example VI*

A solution composed of 600 ml. of pyridine and 43.6 g. (0.2 mole) of 2-benzyl-4-chlorophenol is charged to a four-necked flask which is fitted with a stirrer, reflux condenser and thermometer, and mounted in an ice bath. n-Hexyl chloroformate in the amount of 75.6 g. (0.46 mole) is then slowly added to the solution and the reaction mixture thus formed is allowed to stand about 18 hours while stirring. The solvent, pyridine, is then removed using a water aspirator and mild heating, i.e., about 35°–40° C. The residue is then hydrolyzed with 3 N NaOH and extracted several times with ether, discarding the aqueous layer. The ether layer is then stripped of excess ether and the residual material is distilled under vacuum. The crude product is a viscous yellow liquid, the yield being 65.5 g. (94.5%), boiling at 196°–197° C. (1.0 mm.). The crude product is then redistilled under vacuum and the cut boiling at 196°–197° C. (1.0 mm.) is found upon analysis to be the desired 2-benzyl-4-chlorophenyl n-hexyl carbonate ($C_{20}H_{23}ClO_3$)

Calculated: %C, 69.31; %H, 6.68; %Cl, 10.22. Found: %C, 69.35, 69.39; %H, 6.96, 6.81; %Cl, 10.24, 10.20.

Example VII

A solution composed of 600 ml. of pyridine and 43.6 g. (0.2 mole) of 2-benzyl-4-chlorophenol is charged to a four-necked flask which is fitted with a stirrer, reflux condenser and thermometer, and mounted in an ice bath. Allyl chloroformate in the amount of 28.0 g. (0.234 mole) is then slowly added to the solution and the reaction mixture thus formed is allowed to stand about 18 hours while stirring. The solvent, pyridine, is then removed using a water aspirator and mild heating, i.e., about 35°–40° C. The residue is then hydrolyzed with 3 N NaOH and extracted several times with ether, discarding the aqueous layer. The ether layer is then stripped of excess ether and the residual material is distilled under vacuum. The crude product is a viscous yellow liquid, the yield being 44.6 (73.6%), boiling at 165°–166° C. (1.0 mm.). The crude product is then redistilled under vacuum and the cut boiling at 144°–148° C. (0.3 mm.) is found upon analysis to be the desired 2-benzyl-4-chlorophenyl allyl carbonate ($C_{17}H_{15}ClO_3$). Calculated: %C, 67.44; %H, 4.99; %Cl, 11.77. Found: %C, 67.57, 67.44; %H, 5.03, 5.23; %Cl, 11.94, 11.95.

Example VIII

A solution composed of 600 ml. of pyridine and 43.6 g. (0.2 mole) 2-benzyl-4-chlorophenol is charged to a four-necked flask which is fitted with a stirrer, reflux condenser and thermometer, and is mounted in an ice bath. 2-chloroethylchloroformate in the amount of 57.0 g. (0.4 mole) is then slowly added to the solution and the reaction mixture thus formed is allowed to stand about 18 hours while stirring. Excess pyridine is then removed by heating to about 25°–30° C. under vacuum (2–3 mm.) to eliminate quaternary salt formation between the pyridine and the product. The residue is then hydrolyzed with 3 N NaOH and extracted several times with ether, combining the extracts. The ether extracts are then carefully washed with 1.5 N NaOH (to remove any unreacted 2-benzyl-4-chlorophenol) and then with 3 N HCl (to assure removal of pyridine). The ether layer is then stripped of excess ether and the residual material is distilled under vacuum. The crude product is that boiling at 187°–189° C. (0.8 mm.), the yield being 53.1 g. (81.5%). Analysis reveals the product to be 2-benzyl-4-chlorophenyl 2-chloroethyl carbonate ($C_{16}H_{14}Cl_2O_3$). Calculated: %C, 59.09; %H, 4.34; %Cl, 21.80. Found: %C, 58.87, 59.05; %H, 4.39, 4.31; %Cl, 21.90, 21.88.

Example IX

A three-necked flask fitted with a thermometer, reflux condenser and stirrer is charged with 43.6 g. (0.2 mole) 2-benzyl-4-chlorophenol, 34.0 g. (0.2 mole) benzyl chloroformate, 300 ml. of benzene and 10.6 g. (0.1 mole) $Na_2CO_3$. This mixture is reacted for 16 hours while stirring and maintaining the temperature at 40° C. 50 ml. 4 N NaOH are then added slowly and the reaction is continued for an additional 16 hours at 50° C. The mixture is then cooled and separated in a separatory funnel, discarding the aqueous layer. The benzene layer is washed several times with 1.5 N NaOH and dried overnight. The benzene is removed under reduced pressure with mild heating and the residual material distilled under vacuum. The fraction boiling at 196°–206° C. (0.3–0.5 mm.), 55.1 g. of a cloudy viscous liquid, is collected. Analysis reveals the material to be benzyl 2-benzyl-4-chlorophenyl carbonate ($C_{21}H_{17}ClO_3$). Calculated: %C, 71.48; %H, 4.85; %Cl, 10.04. Found: %C, 71.09, 71.00; %H, 4.85, 4.89; %Cl, 10.11, 10.5.

As indicated at an earlier point herein, these new compounds are biologically effective and, as will be described more fully hereinafter, they may be compounded according to all common methods for convenience of application in the control of various organisms. The concentration of the compounds for toxicity is very small, e.g., as little as two parts per million by weight of the carrier or vehicle, depending upon the organism being treated and the particular compound of the generic formula which is employed.

The new compounds of this invention are especially useful as the active ingredient in toxic quantities in soil-fungicidal compositions, and in sanitization compositions, i.e., cleaning compositions which are also toxic to bacteria, e.g., soap bacteriostats. The compounds are useful also as industrial preservative agents.

The exemplary procedures which illustrate effectiveness as soap bacteriostats consists essentially of adding a stated amount of the compound to a soap solution and preparing serial dilutions of this composition in agar. The agar dilutions are then inoculated with different microbes, incubated at a definite temperature for a definite time after which the dilutions are examined to determine inhibition of growth by the test compound.

Example X

This example shows testing of 2-benzyl-4-chlorophenyl methyl carbonate against *Staphylococcus aureus*. A 2-percent stock solution of 2-benzyl-4-chlorophenyl methyl carbonate diluted 2 to 10 in a soap solution (10 g. Ivory Snow in 80 ml. distilled water) was serially diluted in nutrient agar to provide test samples containing two parts of the carbonate per 1,000,000 parts of the agar. Petri dishes were respectively filled with the test mixture, and the plates thus prepared were then respectively inoculated with said *Staphylococcus aureus* organism and incubated for 48 hours at 37° C. At the end of that time, inspection of the plates showed complete inhibition of growth of the organism, while identical agar test plates, except that the carbonate was not present, showed normal uninhibited bacterial growth.

Example XI

This example shows testing of 2-benzyl-4-chlorophenyl allyl carbonate against *Staphylococcus aureus*. A 1-percent stock solution of 2-benzyl-4-chlorophenyl allyl carbonate prepared from a soap solution (5 g. Ivory Snow in 90 ml. distilled water) was added to nutrient agar to provide test samples containing one part of the carbonate per 10,000 parts of the agar. Petri dishes were respectively filled with the test mixture, and the plates thus prepared were then respectively inoculated with said *Staphylococcus aureus* organism and incubated for 48 hours at 37° C. At the end of that time, inspection of the plates showed complete inhibition of growth of the organism, while identical agar test plates, except that the carbonate was not present, showed normal uninhibited bacterial growth.

The following example shows toxicity to the fungus *Aspergillus niger*.

Example XII

A 1-percent stock solution of the compound 2-benzyl-4-chlorophenyl methyl carbonate in a non-toxic solvent was made up, and this solution was added to sterile, melted dextrose agar in a quantity to give 1 part of the said compound per 10,000 parts of agar. After thorough mixing the thus treated agar was poured into petri dishes and allowed to harden. One drop of a spore suspension of the fungus *Aspergillus niger* was employed as inoculum for each plate. The inoculated plates were incubated at a temperature of 25° C. for five days. At the end of that time, inspection of the dishes showed complete inhibition of growth of the fungus, while plates ont containing the said compound, but otherwise identical and incubated similarly, showed normal uninhibited growth.

Effectiveness of the new compounds herein as fungicidal agents, especially against soil borne pathogens including the "damping off" fungi, principally Phythium, Rhizoctonia and Fusarium species is shown by the following examples. In the examples, the procedure employed involves, generally stated, the following:

Soil infested with "damping off" fungi is treated with the compound to be tested and incubated in a sealed container for 24 hours. Seeds are sown in the treated soil which is incubated at 70° F. for two days and removed to greenhouse benches. Disease assessments are made 10-14 days later. The following disease rating scale is used.

| Rating: | Healthy plants out of 20 |
|---|---|
| Excellent | 18-20 |
| Promising | 15-17 |
| Fair | 12-14 |

*Example XIII*

Five ml. portions of a 1-percent stock solution of 2-benzyl-4-chlorophenyl n-propyl carbonate were added to a series of Mason jars each containing one pound of infested soil. The jars were sealed and the contents thoroughly mixed. The thus treated soil was incubated at room temperature for 24 hours and then transferred to 4-inch clay pots. Five seeds of each of beans (Black Valentine), cotton (Delta Pine 15), cucumber (Straight Eight), and peas (Laxton's Progress) were sown in each pot. The pots were then incubated at 70° F. and at high humidity (98% RH) for 24 hours. The pots were removed to the greenhouse and were examined after two weeks. The rating was found to be "excellent."

*Example XIV*

Procedures identical in all respects with those of Example XIII were followed in testing the effectiveness of 2-benzyl-4-chlorophenyl n-butyl carbonate against "damping off" fungi. The rating was found to be "promising."

*Example XV*

Procedures identical in all respects with those of Example XIII were followed in testing the effectiveness of 2-benzyl-4-chlorophenyl allyl carbonate against "damping off" fungi. The rating was found to be "promising."

When employed as bacteriostats, the new compounds herein may be incorporated into inert organic solvents or into emulsions prepared by mixing such solutions of the compounds with water in the presence of an emulsifying agent. The compounds may also be admixed with soaps or synthetic detergents either solid, powdered, or liquid for use as germicidal cleansing compositions.

When used as fungicidal agents, the new compounds of the invention may be employed according to any suitable method. They may be included with other materials that are being applied to plants or the soil, e.g., insecticides, herbicides, fertilizers, soil conditioners, etc. Thus, they may be employed as sprays or dusts and may suitably be employed with inert carriers and diluents as desired, e.g., talc, clay, lime, bentonite, pumice, etc., either alone or with other agents of kindred nature.

While the invention herein has been described with respect to particular embodiments, those skilled in the art will appreciate that various modifications within the scope of the invention may be derived from the teachings herein. Accordingly, this invention is not to be restricted unduly and is to be understood to extend to all modifications which flow from the teachings herein.

What is claimed is:

1. A compound defined by the general formula

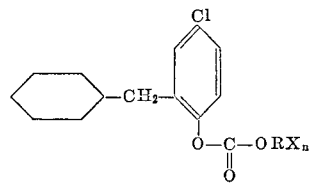

wherein R is selected from the group consisting of saturated and double bond-unsaturated hydrocarbon radicals of from one to eight carbon atoms, X is a radical from the group consisting of hydrogen and halogen, and $n$ is an integer of from one to five.

2. A compound as claimed in claim 1 wherein R is an acyclic hydrocarbon radical.

3. A compound as claimed in claim 1 wherein X is the chlorine radical.

4. A compound as claimed in claim 1 wherein R is an aralkyl radical.

5. A compound as claimed in claim 1 wherein R is an alkaryl radical.

6. 2-benzyl-4-chlorophenyl methyl carbonate.
7. 2-benzyl-4-chlorophenyl ethyl carbonate.
8. 2-benzyl-4-chlorophenyl chloroethyl carbonate.
9. 2-benzyl-4-chlorophenyl n-propyl carbonate.
10. 2-benzyl-4-chlorophenyl allyl carbonate.
11. 2-benzyl-4-chlorophenyl n-butyl carbonate.
12. 2-benzyl-4-chlorophenyl isobutyl carbonate.
13. 2-benzyl-4-chlorophenyl n-hexyl carbonate.
14. Benzyl 2-benzyl-4-chlorophenyl carbonate.

References Cited in the file of this patent

UNITED STATES PATENTS

| 2,340,331 | Knutson et al. | Feb. 1, 1944 |
| 2,548,141 | Bralley | Apr. 10, 1951 |
| 2,567,987 | Baumgartner | Sept. 18, 1951 |
| 2,745,780 | Hafliger | May 15, 1956 |
| 2,758,051 | Smith | Aug. 7, 1956 |
| 2,770,639 | Slocombe et al. | Nov. 13, 1956 |
| 2,821,538 | Dille et al. | Jan. 28, 1958 |